March 30, 1965 I. TURINSKY 3,176,256
TEST FIXTURE
Filed July 30, 1962
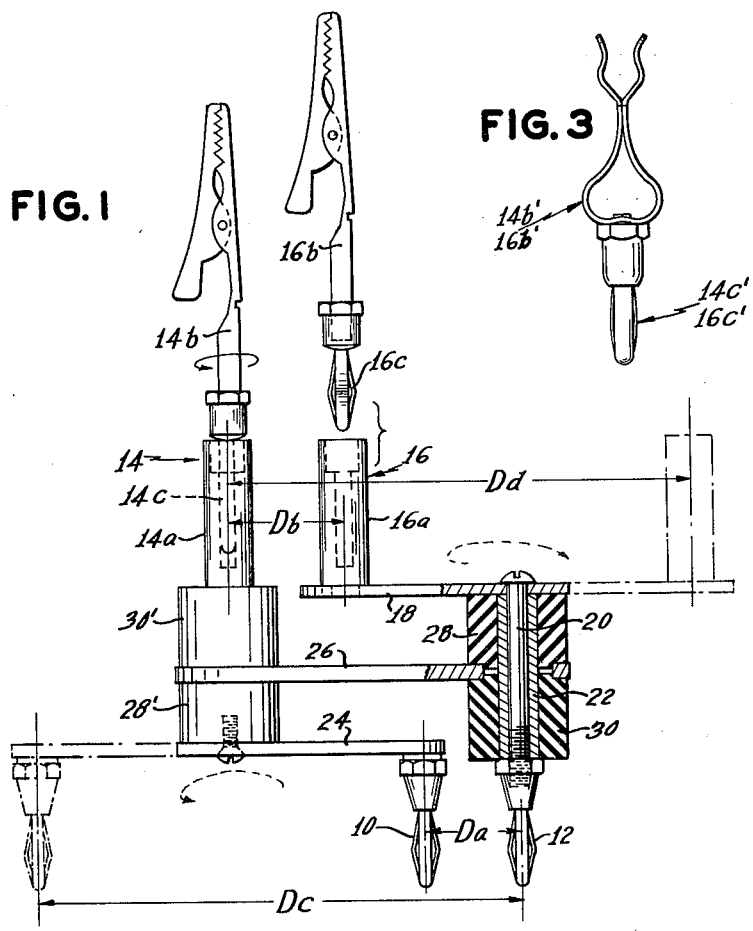
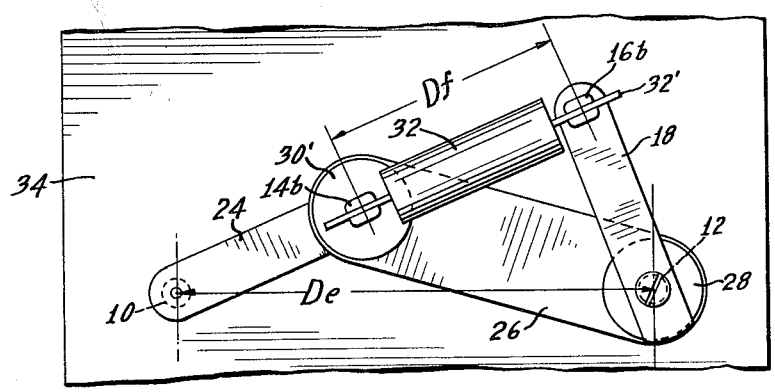

United States Patent Office 3,176,256
Patented Mar. 30, 1965

3,176,256
TEST FIXTURE
Isidore Turinsky, 311 Wicks Ave., North Babylon, N.Y.
Filed July 30, 1962, Ser. No. 213,317
7 Claims. (Cl. 339—31)

The present invention relates to test apparatus and, more particularly, to means for connecting two electrical devices to each other.

In electrical or electronic laboratories, two-terminal components are usually connected to a test instrument for test or measurement in various ways. The connection may be direct to the terminals of the instrument or by test leads or by specialized fixtures. An object of the present invention resides in the provision of a novel test fixture that will form the necessary connections and which, at the same time, will also definitely locate and support the component to be tested.

An important feature of the invention relates to the adaptability of the terminals of the novel test fixture to variously spaced terminals of the test apparatus and to variously spaced terminals of the test component, being in this respect superior to specialized fixtures and to direct connection of the test component to the instrument.

The novel fixture provides mechanically stable support for the test component or for a series of test components that are dimensionally alike. Unlike test leads and makeshift connections, the novel fixture thus avoids introducing an uncertain or varying amount of stray capacitance. This may be of special concern in checking small sizes of capacitors. The stable mechanical support provided by the novel fixture also leaves the technician free to use his hands for more essential tasks, and he no longer requires "a third hand" to hold the test component or a connection.

In the detailed specification that follows there is disclosed a presently preferred embodiment of the invention. This illustrative embodiment includes a support that carries a pair of terminals at one side, which normally plug into the test apparatus, and the support carries a pair of terminals at the opposite side, ordinarily for the test component. At each side of the fixture there is a terminal carried on a crank arm and another terminal that has a fixed position. The latter or fixed terminal at each side of the support is securely connected electrically and mechanically to the crank at the other side of the support. The spacing of each pair of terminals is variable over a wide range, equal to twice the length of each crank. Each pair of terminals may be adjusted without disturbing the other. Despite the provisions for dual independent mechanical adjustments, the electrical circuits involve "solid" circuit structures that insure high reliability in the current paths provided. All parts of the test apparatus are firmly located, and are thus easy to use and virtually immune to strays and to accidental contact with other apparatus nearby.

At one side of the illustrative test fixture, there are two resilient-jawed clips that are suitable for making connections to contact ends of two-terminal test components such as capacitors. Various forms of clips may be used, as preferred, and in some situations they may be omitted; and, similarly, various forms of terminal connections may be provided at the opposite side of the test fixture.

The foregoing and other novel features and advantages will be appreciated from the following detail description of the presently preferred embodiment of the invention that is shown in the accompanying drawings. In the drawings:

FIG. 1 is a side view, partly in section, of a presently preferred embodiment of the invention, certain parts of this embodiment being shown in dotted lines to represent alternative positions of adjustment;

FIG. 2 is a front view of the embodiment in FIG. 1, shown connecting two electrical devices in a typical assembly; and FIG. 3 is an alternative form of resilient clip that may be used in place of the alligator clips in FIG. 1.

In FIG. 1, a first pair of terminals 10 and 12 are shown at one side of the test fixture, these terminals being resilient male plug-in elements called "banana plugs," such as are often used on test leads. The banana plug has four outwardly bowed contact portions that make firm but resilient contact with the wall of a receptacle.

There is another pair of terminals 14 and 16 at the other side of the fixture. Terminal 14 includes a receptacle 14a. Various forms of terminals may be plugged into this receptacle, such as the alligator clip 14b in FIG. 1 or the clip 14b' in FIG. 3 having formed leaf-spring jaws that appear edgewise in the drawing. Each clip 14b or 14b' is mounted on a banana plug 14c that is tightly but rotatably received in receptacle 14a. Terminal 16 similarly includes a receptacle 16a, an alligator clip 16b or a leaf-spring clip 16b' and a banana plug terminal 16c (16c') that is rotatably receivable in receptacle 16a. Alligator clips 14b and 16b are of conventional construction, each having jaws, as shown, and having an internal torsion spring for biasing the jaws together.

Receptacle 16a is rigidly fixed to metal arm 18 that is tightly connected electrically and mechanically to terminal 12 by screw 20 and metal tube 22. This screw, when tightened, forces arm 18 and terminal 12 against the opposite ends of metal tube 22. Terminal 16 and terminal 12, which are connected together, may be called a terminal unit. Metal arm 24 which carries terminal 10 is similarly connected by a screw and metal sleeve to terminal 14 forming a second terminal unit. A support 26, conveniently of metal or of any other suitably strong material, carries the two terminal units in laterally spaced relation. Tubular insulators 28 and 30 are interposed between arm 18 and support 26 and between terminal 12 and support 26, respectively. These insulators form a rotary bearing for the terminal unit 12, 16 at one end of support 26. Insulators 28 and 30 have confronting end portions of reduced diameter that are received in a round hole in support 26, and the end surfaces or shoulders of these insulators 28 and 30 adjacent such reduced-diameter portions bear against the opposite flat faces of support 26. The insulators are preferably of low-friction material such as nylon. The terminal assembly 12, 16, 18, 20, 22, 28 and 30 rotates as a unit on support 26. The assembly, including terminal 10 and terminal 14, is similarly carried rotatably on support 26 by insulators 28' and 30' in a bearing of like construction.

With the parts in the positions shown in FIG. 1, terminals 10 and 12 are as close together as they can be, being spaced by a center-to-center distance $Da$. Terminals 14 and 16 are also spaced by a minimum center-to-center distance $Db$. By swinging arm 24 about the axis of receptacle 14a, the center-to-center distance of terminals 10 and 12 can be increased to provide a maximum spacing $Dc$ and by similarly swinging arm 18 about the axis of terminal 12, terminals 14 and 16 can be adjusted to provide a maximum spacing $Dd$. Arms 18 and 24 move in parallel planes, and swing about parallel axes as shown.

In FIG. 2, the test fixture of FIG. 1 is illustrated in a typical application. An electrical component such as a capacitor 32 has oppositely extending terminals 32' that are gripped by clips 14b and 16b, or 14b' and 16b'. Notably, these clips which are rotatable about their longitudinal axes in their corresponding receptacles 14a and 16a, are automatically aligned with the terminals 32' of the test component. Arm 18 is rotated through an angle relative to the center line of support 26, so that terminal portions 14b and 16b have a suitable center-to-center separation Df that is appropriate to component 32. Similarly, arm 24 is adjusted relative to support 26 so that terminals 10 and 12 have a center-to-center distance De that corresponds to the spacing of conventional receptacles (not shown) in a piece of test equipment 34.

On occasion, the terminals of the electric device 32 to be tested actually have parallel terminals which can enter receptacles 14c and 16c directly. In that case, clips 14b and 16b may be removed. In either case, terminals 14 and 16 present terminals that are correctly spaced for making connection to a component to be tested, and terminals 14 and 16 physically support the component during tests.

Terminals 10 and 12 are adjustable to enter terminal receptacles of test apparatus. This adjustment adapts the test fixture to different pieces of test equipment. Further, it often happens that the test equipment has a number of terminal receptacles distributed along a line, and a pair of such receptacles is to be selected, depending on the test circuit that is to be used. The test fixture described is thus readily adapted to different pieces of test apparatus and to different pairs of terminals of a single piece of test apparatus.

In use, the test fixture is supported by the test apparatus into which terminals 10 and 12 are plugged, and then the test fixture supports the component to be tested. In all normal conditions of use of the test fixture, there is no danger of an accidental contact being made between opposite terminals of the test fixture or between a terminal of the test component and some other exposed connection that may be nearby. The novel test fixture is readily adjustable to conform both to a wide range of spacings of test-instrument terminals and to a wide range of test-component sizes. In this way, the novel test fixture replaces a large number of specialized test fixtures. There is no problem of varying strays during a measurement or series of measurements. There is no problem of a broken wire concealed within insulation, which develops often and without warning in the case of test leads. The test terminals that are to receive the test component, and the test component itself, are definitely located and prominently exposed to view, so that there is never any need to trace the test circuit if puzzling test results should occur.

From the foregoing it will be recognized that the test fixture shown and described is well suited to the purposes of the invention. However, modifications and varied application of the novel features will readily be suggested to those skilled in the art by this disclosure. Consequently, the invention should be broadly construed in accordance with its full spirit and scope.

What is claimed is:

1. Apparatus for connecting two terminals of one electrical device to two terminals of another electrical device, respectively, wherein the spacing between the terminals of each electrical device may vary through a range, said apparatus including a support, a pair of conductive connecting members having intermediate parallel portions extending rotatably through said support at spaced-apart points and insulated from each other, one of said members having a lateral crank portion at one side of said support and the other of said members having a lateral crank portion at the other side of said support, and each said member having a pair of terminal elements disposed respectively at the end of the crank portion thereof at one side of the support and at the opposite side of the support.

2. Apparatus for connecting two terminals of one electrical device to two terminals of another electrical device, respectively, wherein the spacing between the terminals of each electrical device may vary through a range, said apparatus including a support, and a pair of conductive elements extending through said support and mounted thereon for rotation about parallel axes and insulated from each other, a pair of conductive crank arms each having first and second ends, the first end of each crank arm being connected to one end of a respective conductive element, and four terminal elements mounted, respectively, on the ends of said pair of conductive elements opposite the crank arms thereof and on the second ends of said crank arms, said crank arms being disposed at opposite sides of said support.

3. Apparatus for connecting two terminals of one electrical device to two terminals of another electrical device, respectively, wherein the spacing between the terminals of each electrical device may vary through a range, said apparatus including a support, and a pair of conductive elements extending through said support and mounted thereon for rotation about parallel axes and insulated from each other, a pair of conductive crank arms each having one end connected to one end of a respective said conductive element, and four terminal elements mounted, respectively, on the opposite ends of said pair of conductive elements and of said pair of crank arms, said crank arms being disposed at opposite sides of said support, two of said terminal elements at the same side of said support including gripping portions rotatably mounted, respectively, on one of said crank arms and on one of said conductive elements.

4. Apparatus for connecting two terminals of one electrical device to two terminals of another electrical device, respectively, wherein the spacing between the terminals of each electrical device may vary through a range, said apparatus including a support, and a pair of conductive elements extending through said support and mounted thereon for rotation about parallel axes and insulated from each other, a pair of conductive crank arms each having one end connected to one end of a respective said conductive element, and four terminal elements mounted, respectively, on the opposite ends of said pair of conductive elements and of said pair of crank arms, said crank arms being disposed at opposite sides of said support, both terminal elements at one side of said support being parallel male members and both terminal elements at the other side of said support being parallel female elements.

5. A test fixture for connecting an electrical component to test apparatus, said fixture including a pair of plug-in terminals for the test apparatus, a pair of gripping terminals for the electrical component, a crank unit having a shaft and a crank arm, one of said plug-in terminals being carried by said crank arm and one of said gripping terminals being rotatably carried by said shaft, another crank unit including a second crank arm and a second shaft, the other of said gripping terminals being rotatably carried by said second crank arm and the other of said plug-in terminals being carried by said second shaft, and a support rotatably carrying said shafts, said crank arms being disposed at opposite sides of said support.

6. A test fixture for connecting an electrical component to test apparatus, including a support, a pair of connecting units carried at side-by-side positions thereon and insulated from each other, each of said units having first and second terminals, said first terminals being fixed in positions at opposite sides of said support and said second terminals being supported by said connecting units movably relative to the corresponding one of said first terminals at the same side of the support.

7. A test fixture, including a support, a pair of connecting units carried by said support and having respective portions at fixed positions in the support and extending therethrough from one side to the opposite side of the support, each of said connecting units having a pair of terminals respectively at said opposite sides of said support and the test fixture thus having a pair of terminals at each side of said support, said pair of terminals at each side of the support including a first terminal that is fixed in position and said pair of terminals at each side of the support including a second terminal that is individually movable laterally relative to the first terminal at its side of the support and said second terminals being movable laterally relative to each other so that the lateral spacings between the respective pairs of terminals at opposite sides of the fixture are individually adjustable.

References Cited by the Examiner
UNITED STATES PATENTS

| | | | |
|---|---|---|---|
| 2,477,642 | 8/49 | Novello | 339—31 |
| 2,567,510 | 9/51 | Drescher | 339—32 X |
| 2,761,115 | 8/56 | Visconti | 339—32 X |
| 2,832,057 | 4/58 | Thorson | 339—93 |

FOREIGN PATENTS

| | | |
|---|---|---|
| 1,012,702 | 4/52 | France. |
| 251,068 | 4/26 | Great Britain. |
| 262,887 | 12/26 | Great Britain. |

JOSEPH D. SEERS, *Primary Examiner.*